United States Patent [19]

Fukayama et al.

[11] 4,454,262

[45] Jun. 12, 1984

[54] ROOM TEMPERATURE CURABLE POLYORGANOSILOXANE COMPOSITION CONTAINING SPINDLE SHAPED CALCIUM CARBONATE

[75] Inventors: Miyoji Fukayama; Tadao Ishida, both of Ichihara, Japan

[73] Assignee: Toray Silicone Company, Ltd., Tokyo, Japan

[21] Appl. No.: 369,337

[22] Filed: Apr. 16, 1982

[30] Foreign Application Priority Data

Apr. 27, 1981 [JP] Japan ................................ 56/63656

[51] Int. Cl.³ .......................................... C08L 83/06
[52] U.S. Cl. ................................. 523/210; 523/212; 524/425; 525/477; 528/33; 528/34
[58] Field of Search ................. 524/425; 523/210, 212

[56] References Cited

U.S. PATENT DOCUMENTS

| | | | |
|---|---|---|---|
| 3,957,714 | 5/1976 | Clark et al. | 524/425 |
| 4,247,445 | 1/1981 | Smith et al. | 524/425 |
| 4,356,116 | 10/1982 | Beers | 525/477 |

*Primary Examiner*—Wilbert J. Briggs, Sr.
*Attorney, Agent, or Firm*—Roger H. Borrousch

[57] ABSTRACT

A room temperature vulcanizable silicone rubber composition is prepared by mixing hydroxyl or alkoxyl endblocked polydiorganosiloxane, crosslinking agent containing at least two water-hydrolyzable radicals, namely alkoxy, ketoximo, alkenyloxy, aminoxy, amino, and amido, and a spindle-shaped calcium carbonate. Curing the composition results in a silicone rubber with improved thermal stability.

23 Claims, No Drawings

ROOM TEMPERATURE CURABLE POLYORGANOSILOXANE COMPOSITION CONTAINING SPINDLE SHAPED CALCIUM CARBONATE

BACKGROUND OF THE INVENTION

1. Field of the Invention

The present invention relates to a room temperature curable polyorganosiloxane composition containing a specific calcium carbonate. This composition cures to a silicone elastomer which exhibits improved thermal stability properties and physical properties.

2. Description of the Prior Art

Polyorganosiloxane compositions that cure at room temperature by a condensation reaction are generally called RTV (Room Temperature Vulcanizing) silicone rubbers. They are widely used for various services and in various fields because of the ease of the curing reaction and the excellence of the electrical, chemical, and thermal properties of the cured material. Such RTV silicone rubbers are composed mainly of polyorganosiloxane (as the base), crosslinking agents, and fillers. Fillers such as dry silica, wet silica, diatomaceous earth, quartz powder, calcium carbonate, and alumina are generally used. The silicas are the most widely used fillers, and RTV silicone rubbers in which these are utilized are very strong, although the amount of the filler which can be added is restricted because the viscosity of the polyorganosiloxane compositions greatly increase as the amount of silica increases. The viscosity increase with quartz powder and alumina is slight, but the resulting strength is not very great.

Additionally, the use of calcium carbonate as a filler for RTV silicone rubbers is well known and has been presented, for example, in Japanese Patents [Tokkai] Sho No. 52[1977]-2439 and [Tokkai] Sho No. 53 [1978]-34855. Since the viscosity increase and the strength imparted by the calcium carbonate vary according to the various grades, such as heavy calcium carbonate, light calcium carbonate, and fine light calcium carbonate, they are best chosen in ways which are appropriate to their purposes and applications. However, conventional calcium carbonates have the drawback that when combined in RTV silicone rubbers, they have poor thermal stabilities above 150° C.

Calcium carbonate has also been used in one package RTV silicone rubber compositions, such as those made from hydroxyl endblocked polydiorganosiloxanes, finely divided agglomerated precipitated acicular calcium carbonate, acyloxysilanes, and tin carboxylates. Such compositions are described as paintable by Clark and Johnson in U.S. Pat. No. 3,957,714, issued May 18, 1976, and by Smith in U.S. Pat. No. 4,247,445, issued Jan. 27, 1981, and U.S. Pat. No. 4,293,616, issued Oct. 6, 1981.

SUMMARY OF THE INVENTION

The present invention provides a polyorganosiloxane composition containing a specific calcium carbonate. This composition cures at room temperature to a silicone elastomer which possesses excellent thermal stability and physical properties. Such properties are not obtainable when conventional calcium carbonate replaces the specific calcium carbonate described herein.

This invention relates to a polyorganosiloxane composition comprising the product obtained by mixing (A) 100 parts by weight of a polydiorganosiloxane expressed by the average general formula

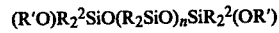

in which R is a monovalent radical selected from the group consisting of hydrocarbon radicals and halogenated hydrocarbon radicals, R' is a hydrogen atom or an alkyl radical, $R^2$ is selected from R or R'O, and n has a value such that the viscosity at 25° C. is in the range from 0.00005 to 1.0 m²/s, (B) 0.1 to 20 parts by weight of a crosslinking agent selected from silanes and siloxanes having at least two water-hydrolyzable radicals per molecule, said hydrolyzable radicals having selected from the group consisting of alkoxy radicals, ketoximo radicals, alkenyloxy radicals, aminoxy radicals, amino radicals, and amido radicals, and (C) 5 to 300 parts by weight of calcium carbonate which has spindle-shaped particles, a specific surface area as measured by the BET method of 1 to 30 m²/g, and an average particle size in the range of 0.3 to 10 μm.

DETAILED DESCRIPTION OF THE INVENTION

The polydiorganosiloxane of (A) has hydroxyl radicals or alkoxy radicals at the ends of the molecular chain and is expressed by the average general formula

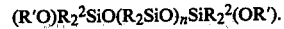

R is a monovalent hydrocarbon radical, for example, methyl, ethyl, propyl, butyl, octyl, vinyl, allyl, phenyl, tolyl, benzyl, and phenylethyl, or a monovalent halogenated hydrocarbon radical, such as 3,3,3-trifluoropropyl. R' is a hydrogen atom or an alkyl radical such as methyl, ethyl, propyl, butyl, or octyl. $R^2$ is selected from R and R'O, and n has a value such that the viscosity at 25° C. of the polydiorganosiloxane is in the range of 0.00005 to 1.0 m²/s, preferably in the range of 0.0001 to 0.1 m²/s, wherein the best combination of physical properties and workability is obtained. The polydiorganosiloxane can be homopolymers, copolymers, and mixtures thereof. Examples of siloxane units which make up these polymers are: dimethylsiloxane, methylphenylsiloxane, methylethylsiloxane, 3,3,3-trifluoropropylmethylsiloxane, 3,3,3-trifluoropropylethylsiloxane, and 3,3,3-trifluoropropylphenylsiloxane. The polydiorganosiloxane of (A) is preferably polydimethylsiloxane. Although the formula for the polydiorganosiloxane describes a linear polymer, branching can be present in these polymers.

The silanes or siloxanes of (B) containing at least two water-hydrolyzable radicals in each molecule are crosslinking agents for the purpose of yielding a rubber elastomer by reacting with the hydroxyl or alkoxy radicals at the ends of the molecular chain of component (A). The water-hydrolyzable radicals are those selected from alkoxy, ketoximo, alkenyloxy, aminoxy, amino, and amido radicals. Acetoxysilanes are not suitable because the acetic acid liberated during the condensation reaction reacts with the calcium carbonate of component (C) and generates carbonic acid gas and foams.

Examples of component (B) are alkoxysilanes such as $(CH_3)Si(OCH_3)_3$, $(CH_3)Si(OC_2H_5)_3$, $(CH_2=CH)Si(OCH_3)_3$, $(C_6H_5)Si(OC_2H_5)_3$, $Si(OC_2H_5)_4$, $Si(OC_3H_7)_4$, and $(CH_2=CH)Si(OC_2H_5)_3$, alkoxysiloxanes such as the partial hydrolysis products of the alkoxysilanes and alkoxysiloxanes such as

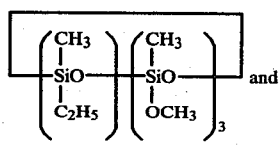

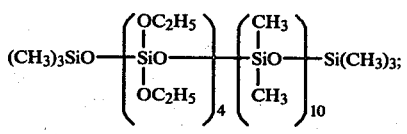

ketoximosilanes such as $(CH_3)Si[ON=C(CH_3)_2]_3$, $(CH_2=CH)Si[ON=C(CH_3)(C_2H_5)]_3$, $(C_6H_5)Si[ON=C(CH_3)_2]_3$, $Si[ON=C(CH_3)(C_2H_5)]_4$,

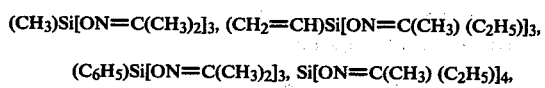

$(CH_3)(CH_2=CH)Si[ON=C(CH_3)_2]_2$, and ketoximosiloxanes which are the partial hydrolysis products of the ketoximosilanes and ketoximosiloxanes such as

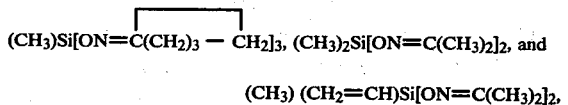

alkenyloxysilanes and alkenyloxysiloxanes can have vinyloxy radicals and cyclohexenloxy radicals, for example. Vinyloxysilanes and vinyloxysiloxanes of the following formulae illustrate the alkenyloxysilanes and alkenyloxysiloxanes, the partial hydrolysis products are also included:

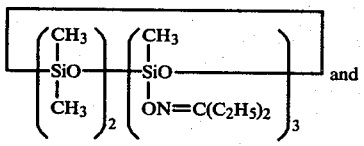

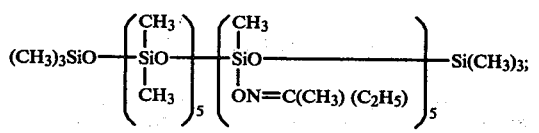

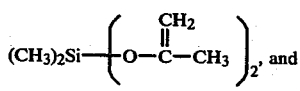

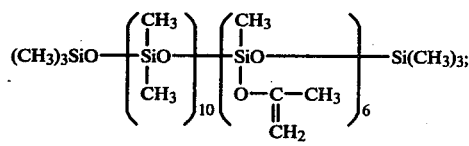

aminoxysilanes and aminoxysiloxanes can be illustrated by $(CH_3)Si[ON(CH_3)_2]_3$, $(CH_2=CH)Si[ON(CH_3)_2]_3$, $(C_6H_5)Si[ON(CH_3)_2]_3$, $Si[ON(C_2H_5)_2]_4$, $(CH_3)(CH_2=CH)Si[ON(CH_3)_2]_2$,

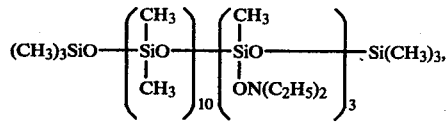

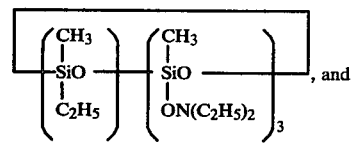

the partial hydrolysis products of the aminoxysilanes; aminosilanes and aminosiloxanes can be illustrated by, $(CH_3)Si[N(CH_3)_2]_3$, $(CH_2=CH)Si[N(CH_3)(C_2H_5)]_3$,
$(C_6H_5)Si[N(CH_3)_2]_3$, $Si[N(C_2H_5)_2]_4$,
$(CH_3)(CH_2=CH)Si[N(CH_3)(C_2H_5)]_2$,

and the partial hydrolysis products of the aminosilanes; and amidosilanes and amidosiloxanes can be illustrated by

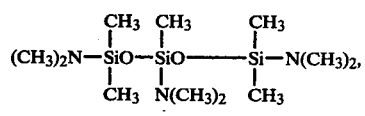

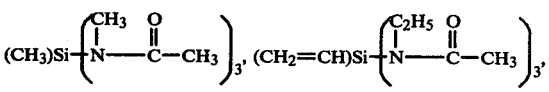

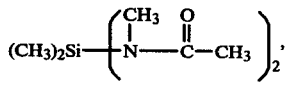

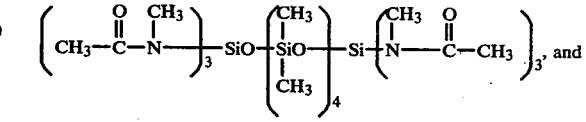

the partial hydrolysis products of the amidosilanes.

A single variety of component (B), or a mixture of two or more varieties can be used. When a mixture of two or more varieties is used, the water-hydrolyzable radicals can be different species. As component (A), all α,ω-dihydroxydiorganopolysiloxane or all α,ω-dialkoxydiorganopolysiloxane is used. When using a material with two water-hydrolyzable radicals in each molecule as component (B), one should mix this with a component (B) containing three or more water-hydrolyzable radicals in each molecule. This does not apply, however, when using one with three or more hydroxy or alkoxy radicals in each molecule as component (A).

The amount of component (B) is 0.1 to 20 parts by weight per 100 parts by weight of component (A). When the amount is less than 0.1 part by weight, the crosslinking agent is insufficient and the composition does not thoroughly cure. When the amount is greater than 20 parts by weight, the crosslinking agent is excessive and the curing process is too slow.

One and two package compositions can be made from these compositions. One package compositions are stable in a moisture excluding package, but cure to an elastomer when exposed to moisture. Because the water-hydrolyzable radicals of component (B) are sensitive to moisture, one package compositions are obtained by mixing (A), (B), and (C) under moisture excluding conditions. To store such one package compositions, they are packaged in moisture excluding containers. Such moisture excluding packages keep the composition in the uncured state until the composition is ready to be cured, at which time it is removed from the package, exposed to the atmosphere, and the curing process takes place. One package compositions are those which contain a sufficient amount of crosslinking agent to provide at least one molecule of (B) silane or siloxane per OR' in (A) where R' is a hydrogen atom. Except for alkoxysilanes and alkoxysiloxanes, the crosslinking agents of (B) can be cured without a catalyst. Alkoxysiloxanes such as ethylpolysilicate are not particularly suitable for one package compositions. Alkoxysilanes can be used to make one package compositions and are catalyzed with an organic titanate. Preferred one package compositions containing alkoxysilanes are those which contain methyldimethoxysiloxy endblocked polydimethylsiloxane as component (A), methyltrimethoxysilane as crosslinking agent, and an organic titanate catalyst. Although these preferred alkoxysilane containing one package composition can be cured without any crosslinking agent (B), better products are obtained when some crosslinking agent is present.

Two package compositions can be prepared by packaging at least component (A) and component (B) in separate packages. Component (C) and any catalyst can be combined with either component (A), component (B), or both. If the compositions are to be used immediately, no special precautions are necessary to exclude moisture, but if storage is desirable, component (B) should be protected from moisture until mixed with component (A) and cure is desired.

The calcium carbonate of component (C) is an important component in bestowing the properties that are distinctive of the present invention. It is essential to use spindle-shaped (also referred to as needle-shaped) calcium carbonate which has a specific surface area, as measured by the BET method, of 1 to 30 m²/g, and an average particle size of 0.3 to 10 μm as component (C). The average particle size spoken of here indicates the average value of the diameter as measured along the largest particle dimension. Among the calcium carbonates, as is well known by persons in this field, there are heavy calcium carbonates made by mechanical pulverization, precipitated calcium carbonates made by chemical precipitation methods, light calcium carbonate, extremely fine precipitated calcium carbonate, and colloidal calcium carbonate. The calcium carbonate used in the present invention belongs to the light calcium carbonates, and among these is one which has a spindle shape. It is surprising that by using this spindle-shaped calcium carbonate that it alone produces the remarkable effects upon the thermal stability and physical property of the elastomers obtained by curing the compositions described herein. Examples of such calcium carbonate include Silver W and SL-101, manufactured by the Shiraishi Kogyo K.K., and the light calcium carbonate manufactured by Takehara Kagaku K.K. There are no particular restrictions as to whether or not the surface of the calcium carbonate is treated, but applying a surface treatment, preferably with organosilanes such as aminoalkoxysilanes and vinylalkoxysilanes, organosilazanes, and organopolysiloxanes, yields even more striking results.

Catalyst can be used in the present composition to aid the curing process and, in some cases, are required to obtain satisfactory curing. Catalysts used in these RTV compositions can be carboxylic acid salts of tin, lead, titanium, zirconium, iron, antimony, cadmium, barium, calcium, bismuth, manganese, and organic titanates such as organic esters of titanic acid and organic titanium chelate compounds. Examples of the catalysts are tin compounds such as dibutyltin dilaurate, dibutyltin dioctoate, stannous octoate, and organic titanates such as tetrabutyltitanate, tetraisopropyltitanate, and diisopropoxybis(acetoacetonate)titanium. The quantities of these which are combined vary according to the activities of the crosslinking agents of component (B), but within the range of 0 to 5 parts by weight per 100 parts by weight of component (A). The reason for zero parts here is that in cases where a highly active crosslinking agent, such as amidosilane, aminoxysilane, or amidosiloxane and aminoxysiloxane, is used, it is possible to cure the rubber without a catalyst. As described above, one package alkoxysilane containing compositions use organic titanates as catalysts.

Other ingredients can also be used in these compositions, such as pigments, heat stability additives such as iron oxide, cerium oxide, and cerium hydroxide, flame retardants, fungicides, and fillers. The fillers can be fumed silica, precipitated silica, quartz micropowder, diatomaceous earth, zinc oxide, titanium oxide, carbon black, and glass fibers.

Also, in accordance with the applications and objectives, it is possible to add binding agents, such as polydiorganosiloxane, in which both ends are blocked with trimethylsiloxy groups, alkenyl groups, vinylcarbonyloxy groups, unsubstituted or substituted amino groups, and alkoxysilanes containing epoxy or mercapto groups.

The composition of the present invention has superior thermal stability in comparison with conventional organopolysiloxane compositions which cure at room temperature and which are filled with calcium carbonate, and it is possible to obtain a silicone rubber in which the changes in the physical properties and the weight loss due to heating are markedly improved. It is possible to obtain an inexpensive silicone rubber because calcium carbonate is used, which is inexpensive when compared to other fillers. Consequently, the present composition can be effectively used as a silicone rubber for potting materials, adhesives, for models of artificial food, for making models of art objects, for a construction and general industry sealant, and for various rolls (particularly heat fixing rolls).

Next, the present invention will be explained concretely with examples. In these examples, "parts" always designates parts by weight. Viscosity is the value at 25° C.

EXAMPLE 1

A polyorganosiloxane composition was prepared by adding 25 parts of diatomaceous earth (Cellite Super Floss) and 20 parts of spindle-shaped light calcium carbonate with an average particle size of 1.7 μm and a specific surface area of 5 $m^2/g$ (Silver W, manufactured by Shiraishi Kogyo K.K.) to 100 parts of hydroxyl endblocked polydimethylsiloxane having a viscosity of 0.006 $m^2/s$ and mixing uniformly. To this mixture, 4.5 parts of ethylpolysilicate and 0.7 part of dibutyltin dilaurate were added and uniformly mixed. This mixture was then poured into an aluminum mold, left alone for 7 days at room temperature, and a silicone rubber sheet with a thickness of 2.5 mm was produced. The physical properties of this silicone rubber were determined and its hardness and weight loss after thermal treatment were measured after it had been heated for 70 days at 200° C. The results are shown in Table I.

As Comparison Examples, silicone rubber sheets were prepared under identical conditions as those described above except for using Mamakaruso (light calcium carbonate manufactured by Nitto Funka Kogyo K.K.), Neolite TPS (light calcium carbonate manufactured by Takehara Kagaku Kogyo K.K.), and Hakuenka CC (aliphatic, acid-treated colloidal calcium carbonate manufactured by Shiraishi Kogyo K.K.) as calcium carbonates other than those defined for the present invention. The results of the measurements of their physical properties and thermal stabilities are shown in Table I.

TABLE I

| Test No. | Present Invention 1 | Comparison Example 1 | 2 | 3 |
|---|---|---|---|---|
| Calcium Carbonate, Tradename | Silver W | Mamakaruso | Neolite TPS | Hakuenka CC |
| Average Particle Size, μm | 1.7 | 2.2 | 0.1 | 0.04 |
| Specific Surface Area, $m^2/g$ | 5 | 0.9 | 7 | 31 |
| Form | Spindle-shaped | Granular | Granular | Granular |
| Physical Properties | | | | |
| Hardness (JIS-A) | 44 | 44 | 46 | 41 |
| Tensile Strength, MPa | 2.06 | 1.57 | 2.26 | 1.96 |
| Elongation, % | 190 | 160 | 170 | 150 |
| After Heat Treatment for 70 Days at 200° C. | | | | |
| Hardness (JIS-A) | 38 | 35 | 41 | 46 |
| Loss Upon Heating, Wt % | 4.4 | 8.9 | 11.3 | 12.4 |

EXAMPLE 2

A polyorganosiloxane composition was prepared by uniformly mixing 25 parts of trimethylsiloxy endblocked polydimethylsiloxane having a viscosity of 0.001 $m^2/s$, 25 parts of the spindle-shaped calcium carbonate defined in Example 1 (Silver W), 5 parts of crystalline silica, and 100 parts of hydroxyl endblocked polydimethylsiloxane having a viscosity of 0.003 $m^2/s$. To 100 parts of the resulting mixture, 3 parts of n-propyl orthosilicate and 0.5 part of dibutyltin dilaurate were added and uniformly mixed into the mixture.

A mixture of 100 parts of Silver W, 5 parts of gamma-aminopropyltriethoxysilane, and 100 parts of 1,1,1-trichloroethane were mixed and stirred for 30 minutes at room temperature under a nitrogen flow. Gradually the 1,1,1-trichloroethane was completely removed at reduced pressure, and a gamma-aminopropyltriethoxysilane-treated calcium carbonate was obtained. A calcium carbonate treated with vinyltrimethoxysilane was also obtained under identical treatment conditions. Using these calcium carbonates, silicone rubber sheets were formed following the same procedures as described above. Their physical properties and thermal stabilities were then measured.

As Comparison Examples, silicone rubber sheets were prepared under identical conditions as those above, aside from the fact that Vigot-15 (aliphatic acid-treated light calcium carbonate manufactured by Shiraishi Kogyo K.K.) and NC-100 (light calcium carbonate manufactured by Shiraishi Kogyo K.K.) were used as calcium carbonates other than those defined for the present invention. The physical properties and thermal stabilities of these sheets were measured, and the results are shown in Table II.

TABLE II

| Test No. | Present Invention 2 | 3 | 4 | Comparison Examples 4 | 5 |
|---|---|---|---|---|---|
| Calcium Carbonate, Tradename | Silver W | Silver W | Silver W | Vigot-15 | NC-100 |
| Surface Treatment | None | γ-Aminopropyltriethoxysilane | Vinyltrimethoxysilane | Aliphatic acid | None |
| Average Particle Size, μm | 1.7 | 2 | 2 | 0.15 | 1.0 |
| Specific Surface Area, $m^2/g$ | 5 | 8 | 8 | | |
| Form | Spindle-shaped | Spindle-shaped | Spindle-shaped | Spherical | Spherical |
| Physical Properties | | | | | |
| Hardness (JIS-A) | 27 | 28 | 29 | 19 | 23 |
| Tensile Strength, MPa | 0.78 | 1.18 | 1.37 | 0.78 | 0.88 |
| Elongation, % | 190 | 200 | 210 | 260 | 250 |
| After Heat Treatment for 48 Days at 200° C. | | | | | |
| Hardness (JIS-A) | 27 | 30 | 27 | 60 | 29 |
| Loss Upon Heating, Wt % | 16.6 | 11.8 | 7.9 | 56.7 | 32.1 |

EXAMPLE 3

A polyorganosiloxane composition was prepared by uniformly mixing 20 parts of trimethylsiloxy endblocked polydimethylsiloxane having a viscosity of 0.0001 m²/s, 100 parts of Silver W, and 80 parts of hydroxyl endblocked polydimethylsiloxane having a viscosity of 0.015 m²/s. To 100 parts of the resulting mixture, 7 parts of methyltris(methylethylketoximo)silane and 0.07 part of dibutyltin dilaurate were added and thoroughly mixed into this mixture. The physical properties of the silicone rubber sheet after the curing of this composition and its thermal stability when heated for 48 days at 150° C. were measured, and the results obtained are shown in Table III.

As a Comparison Example, a composition was prepared by the same procedure described above except that U (colloidal calcium carbonate treated with a cationic surfactant which has an average particle size of 0.04 μm and a specific surface area of 32 m²/g, spherical, manufactured by Shiraseki Kogyo K.K.) was used in place of the Silver W. Its physical properties after curing and its thermal stability are also shown in Table III.

TABLE III

| Physical Properties | Present Invention Test No. 5 | Comparison Example |
| --- | --- | --- |
| Hardness (JIS-A) | 18 | 20 |
| Tensile Strength, MPa | 0.98 | 1.18 |
| Elongation, % | 320 | 450 |
| After Heating for 48 Days at 150° C. | | |
| Hardness (JIS-A) | 20 | 53 |
| Tensile Strength, MPa | 1.08 | 1.47 |
| Elongation, % | 250 | 220 |

EXAMPLE 4

A polyorganosiloxane composition was prepared by uniformly mixing 60 parts of SL-101 (a spindle-shaped light calcium carbonate treated with an aminosilane having an average particle size of 4 μm and a specific surface area of 7.9 m²/g, manufactured by Shiraishi Kogyo K.K.) and 100 parts of hydroxyl endblocked polydimethylsiloxane having a viscosity of 0.02 m²/s. To 100 parts of this mixture, the amounts of crosslinking agent were added as described in Table IV. In Table IV, Test Nos. 6 and 7 contain as the crosslinking agent, a chain extending agent having two water-hydrolyzable radicals per molecule and a crosslinker having three water-hydrolyzable radicals per molecule, and Test No. 8 contains a crosslinking agent having three water-hydrolyzable radicals per molecule and 0.5 part of dibutyltin dilaurate. Silicone rubber sheets were prepared in the same manner as described in Example 1. The physical properties of these rubber sheets and their thermal stabilities when heated for 60 days at 150° C. were measured, and the results shown in Table IV were obtained.

TABLE IV

| Test No. | Present Invention 6 | 7 | 8 |
| --- | --- | --- | --- |
| Chain Extending Agent | $\left[\begin{array}{c}CH_3\\|\\-SiO-\\|\\C_2H_5\end{array}\right]_2 \left[\begin{array}{c}CH_3\\|\\SiO\\|\\ON-(C_2H_5)_2\end{array}\right]_2$ | $(CH_3)_2Si(N{-}CCH_3)_2$ with $\|O$ | — |
| | 3 parts | 6 parts | |
| Crosslinking Agents | $\left[\begin{array}{c}CH_3\\|\\-SiO-\\|\\C_2H_5\end{array}\right] \left[\begin{array}{c}CH_3\\|\\SiO\\|\\ON-(C_2H_5)_2\end{array}\right]_3$ | $\left[\begin{array}{c}CH_3\\|\\-SiO-\\|\\C_2H_5\end{array}\right] \left[\begin{array}{c}CH_3\\|\\SiO\\|\\ON-(C_2H_5)_2\end{array}\right]_3$ | $CH_3-Si(OC(=CH_2)-CH_3)_3$ |
| | 0.15 part | 0.3 part | 3 parts |
| Physical Properties | | | |
| Hardness (JIS-A) | 18 | 15 | 28 |
| Tensile Strength, MPa | 1.43 | 1.22 | 2.71 |
| Elongation, % | 1340 | 1570 | 320 |
| After Heating for 60 Days at 150° C. | | | |
| Hardness (JIS-A) | 15 | 14 | 27 |
| Loss Upon Heating, Wt % | 3.4 | 2.2 | 2.0 |

EXAMPLE 5

A polyorganosiloxane composition was prepared by uniformly mixing 60 parts of SL-101 as described in Example 4, 100 parts of methyldimethoxysiloxy endblocked polydimethylsiloxane having a viscosity of 0.012 m²/s. To 100 parts of this mixture, 6 parts of methyltrimethoxysilane and 2 parts of tetrabutyltitanate were added. The physical properties of silicon rubber sheets were obtained by curing the composition as described in Example 1 and measuring the hardness, tensile strength, and elongation. The thermal stability of the silicone rubber sheets were determined by heating them for 30 days at 180° C. and measuring the hardness and the weight lost upon heating. The results were as shown in Table V.

TABLE V

| Physical Properties | Present Invention Test No. 9 |
| --- | --- |
| Hardness (JIS-A) | 32 |
| Tensile Strength, MPa | 2.35 |

TABLE V-continued

| Physical Properties | Present Invention Test No. 9 |
|---|---|
| Elongation, % After Heating for 30 Days at 150° C. | 275 |
| Hardness (JIS-A) | 30 |
| Loss Upon Heating, Wt % | 1.7 |

That which is claimed is:

1. A polyorganosiloxane composition comprising the product obtained by mixing
   (A) 100 parts by weight of a polydiorganosiloxane expressed by the average general formula $(R'O)R_2^2SiO(R_2SiO)_nSiR_2^2(OR')$ in which R is a monovalent radical selected from the group consisting of hydrocarbon radicals and halogenated hydrocarbon radicals, R' is a hydrogen atom or an alkyl radical, $R^2$ is selected from R or R'O, and n has a value such that the viscosity at 25° C. is in the range from 0.00005 to 1.0 m$^2$/s,
   (B) 0.1 to 20 parts by weight of a crosslinking agent selected from silanes and siloxanes having at least two water-hydrolyzable radicals per molecule, said hydrolyzable radicals being selected from the group consisting of alkoxy radicals, ketoximo radicals, alkenyloxy radicals, aminoxy radicals, amino radicals, and amido radicals, and
   (C) 5 to 300 parts by weight of calcium carbonate which has spindle-shaped particles, a specific surface area as measured by the BET method of 1 to 30 m$^2$/g, and an average particle size in the range of 0.3 to 10 μm.

2. The polyorganosiloxane composition according to claim 1 further comprising a catalyst and in which (B) is an alkoxysilane or alkoxysiloxane having at least three alkoxy radicals per molecule.

3. The polyorganosiloxane composition according to claim 2 in which the catalyst is a metal salt of a carboxylic acid where the metal is selected from the group consisting of tin, lead, titanium, zirconium, iron, antimony, cadmium, barium, calcium, bismuth, and manganese.

4. The polyorganosiloxane composition according to claim 3 in which the metal of the metal salt is tin.

5. The polyorganosiloxane composition according to claim 4 in which the crosslinking agent is an alkoxysiloxane.

6. The polyorganosiloxane composition according to claim 5 in which R is methyl, R' is a hydrogen atom, $R^2$ is methyl, the viscosity of the polydiorganosiloxane is in the range of 0.0001 to 0.1 m$^2$/s, the alkoxysiloxane is ethylpolysilicate, and the catalyst is dibutyltin dilaurate.

7. The polyorganosiloxane composition according to claim 4 in which the crosslinking agent is an alkoxysilane.

8. The polyorganosiloxane composition according to claim 4 in which R is methyl, R' is a hydrogen atom, $R^2$ is methyl, the viscosity of the polydiorganosiloxane is in the range of 0.0001 to 0.1 m$^2$/s, the alkoxysilane is tetra-n-propoxysilane, and the catalyst is dibutyltin dilaurate.

9. The polyorganosiloxane composition according to claim 1 in which the product is stable in a moisture excluding package but cures to an elastomer when exposed to moisture, said product obtained by mixing (A), (B), and (C) under moisture excluding conditions, R' is a hydrogen atom, the crosslinking agent is present in an amount sufficient to provide at least one molecule of silane and siloxane of (B) per OR' in (A).

10. The polyorganosiloxane composition according to claim 9 in which the hydrolyzable radicals of (B) are ketoximo radicals.

11. The polyorganosiloxane composition according to claim 10 in which the polydiorganosiloxane has a viscosity in the range of 0.001 to 0.1 m$^2$/s, R is methyl, $R^2$ is methyl, and the crosslinking agent is a ketoximosilane.

12. The polyorganosiloxane composition according to claim 11 in which the ketoximosilane is methyltris(methylethylketoximo)silane, there is also present dibutyltin dilaurate as a catalyst.

13. The polyorganosiloxane composition according to claim 9 in which the hydrolyzable radicals of (B) are aminoxy radicals.

14. The polyorganosiloxane composition according to claim 13 in which the polydiorganosiloxane has a viscosity in the range of 0.0001 to 0.1 m$^2$/s, R is methyl, $R^2$ is methyl, and the crosslinking agent is aminoxysiloxane.

15. The polyorganosiloxane composition according to claim 14 in which the aminoxysiloxane is a mixture of siloxanes having the formulae

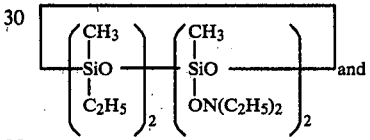 and

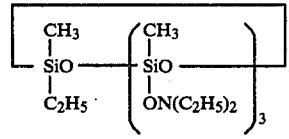

16. The polyorganosiloxane composition according to claim 9 in which the polydiorganosiloxane has a viscosity in the range of 0.0001 to 0.1 m$^2$/s, R is methyl, $R^2$ is methyl, and the crosslinking agent is a mixture of dimethyldi(N-methylacetamido)silane and an aminoxysiloxane of the formula

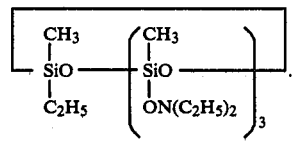

17. The polyorganosiloxane composition according to claim 9 in which the hydrolyzable radical is an alkenyloxy radical.

18. The polyorganosiloxane composition according to claim 17 in which the polydiorganosiloxane has a viscosity in the range of 0.0001 to 0.1 m$^2$/s, R is methyl, $R^2$ is methyl, and the crosslinking agent is an alkenyloxysilane.

19. The polyorganosiloxane composition according to claim 18 in which the alkenyloxysilane has a formula

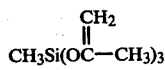

and there is also present dibutyltin dilaurate.

20. The polyorganosiloxane composition according to claim 1 in which the product is stable in a moisture excluding package but cures to an elastomer when exposed to moisture, said product obtained by mixing (A), (B), and (C) under moisture excluding conditions, R is methyl, R' is methyl, each chain terminating silicon atom of the polydiorganosiloxane has one $R^2$ as methyl and one $R^2$ as methoxy, the crosslinking agent is methyltrimethoxysilane, and there is present an organotitanate catalyst.

21. The polyorganosiloxane composition according to claims 1, 3, 5, 6, 7, 8, 9, 11, 14, 16, 18 or 20 in which the surface of the calcium carbonate of (C) is treated with an organosilane, organosilazane, or an organopolysiloxane.

22. The polyorganosiloxane composition according to claims 7 or 8 in which the surface of the calcium carbonate is treated with an organosilane selected from the group consisting of gamma-aminopropyltriethoxysilane and vinyltrimethoxysilane.

23. The polyorganosiloxane composition according to claims 9, 13, 14, 15, 16, 17, 18, or 19 in which the surface of the calcium carbonate is treated with an aminoorgano(alkoxy)silane.

* * * * *